United States Patent
Kim et al.

(10) Patent No.: US 10,568,015 B2
(45) Date of Patent: Feb. 18, 2020

(54) METHOD FOR PERFORMING CHANNEL ACCESS IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/747,685

(22) PCT Filed: Aug. 5, 2016

(86) PCT No.: PCT/KR2016/008639
§ 371 (c)(1),
(2) Date: Jan. 25, 2018

(87) PCT Pub. No.: WO2017/023141
PCT Pub. Date: Feb. 9, 2017

(65) Prior Publication Data
US 2018/0220357 A1 Aug. 2, 2018

Related U.S. Application Data

(60) Provisional application No. 62/201,540, filed on Aug. 5, 2015.

(51) Int. Cl.
*H04W 4/00* (2018.01)
*H04W 48/02* (2009.01)
(Continued)

(52) U.S. Cl.
CPC ........... *H04W 48/02* (2013.01); *H04L 5/0048* (2013.01); *H04L 5/0055* (2013.01); *H04W 48/08* (2013.01); *H04W 84/12* (2013.01)

(58) Field of Classification Search
CPC ................................................. H04W 48/02
See application file for complete search history.

(56) References Cited

U.S. PATENT DOCUMENTS

| 9,608,789 B2 * | 3/2017 | Wang ..................... H04L 5/0055 |
| 10,057,924 B2 * | 8/2018 | Li ............................. H04L 5/00 |

(Continued)

FOREIGN PATENT DOCUMENTS

| WO | 2015034166 | 3/2015 |
| WO | 2015053499 | 4/2015 |

OTHER PUBLICATIONS

PCT International Application No. PCT/KR2016/008639, Written Opinion of the International Searching Authority dated Nov. 17, 2016, 16 pages.

(Continued)

*Primary Examiner* — Guang W Li
(74) *Attorney, Agent, or Firm* — Lee Hong Degerman Kang & Waimey

(57) ABSTRACT

According to one embodiment of the present invention, a method by which a station (STA) performs an extended inter-frame space (EIFS) operation in a wireless LAN system supporting multi-user (MU) transmission comprise the steps of: receiving a MU frame including a SIG-A field and a SIG-B field; estimating, by other STAs for receiving the MU frame, an ACK transmission time (ACK Tx Time) required for transmitting ACK information when the MU frame causes the EIFS operation; and delaying channel access during an EIFS time determined on the basis of the estimated ACK transmission time, wherein the step for estimating the ACK transmission time enables the estimation of the ACK transmission time by assuming the lowest MCS level among modulation and coding scheme (MCS) levels used for the transmission of the ACK information, and (Continued)

the minimum resource (RU) among the RUs used for the transmission of the ACK information.

13 Claims, 15 Drawing Sheets

(51) Int. Cl.
*H04L 5/00* (2006.01)
*H04W 84/12* (2009.01)
*H04W 48/08* (2009.01)

(56) References Cited

U.S. PATENT DOCUMENTS

| | | | |
|---|---|---|---|
| 10,218,463 B2* | 2/2019 | Lou | H04L 1/0079 |
| 2013/0294531 A1 | 11/2013 | Vedantham et al. | |
| 2013/0301569 A1* | 11/2013 | Wang | H04L 5/0055 |
| | | | 370/329 |
| 2014/0079016 A1* | 3/2014 | Dai | H04L 5/0041 |
| | | | 370/330 |
| 2014/0233478 A1* | 8/2014 | Wentink | H04L 5/0055 |
| | | | 370/329 |
| 2014/0233551 A1* | 8/2014 | Wentink | H04L 1/1621 |
| | | | 370/338 |
| 2015/0382333 A1* | 12/2015 | Seok | H04W 74/0808 |
| | | | 370/338 |
| 2016/0029373 A1* | 1/2016 | Seok | H04L 5/0055 |
| | | | 370/338 |
| 2016/0043855 A1* | 2/2016 | Seok | H04L 5/0055 |
| | | | 370/330 |
| 2016/0050659 A1* | 2/2016 | Seok | H04L 1/0003 |
| | | | 370/338 |
| 2016/0105836 A1* | 4/2016 | Seok | H04W 72/042 |
| | | | 370/331 |
| 2016/0150514 A1* | 5/2016 | Kwon | H04W 74/0816 |
| | | | 370/329 |
| 2017/0048048 A1* | 2/2017 | Seok | H04L 5/0055 |
| 2017/0230149 A1* | 8/2017 | Wang | H04L 1/0057 |

OTHER PUBLICATIONS

Ahn, J. et al., "Multi-STA Block ACK Protection", doc.: IEEE 802.11-15/0611r1, May 2015, 14 pages.

* cited by examiner

METHOD FOR PERFORMING CHANNEL ACCESS IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2016/008639, filed on Aug. 5, 2016, which claims the benefit of U.S. Provisional Application No. 62/201,540, filed on Aug. 5, 2015, the contents of which are all hereby incorporated by reference herein in their entirety.

TECHNICAL FIELD

The present invention relates to a wireless LAN system, and more particularly, to a method of a channel access based on EIFS operation in a wireless LAN system supporting multi-user transmission and apparatus therefor.

BACKGROUND ART

Standards for a WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps, and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams, and IEEE 802.11ax standards are under discussion.

DISCLOSURE OF THE INVENTION

Technical Task

The technical task of the present invention is to provide a method of a channel access for protecting ACK or block ACK based on EIFS operation in a wireless LAN system supporting a multi-user protocol such as OFDMA or MU-MIMO and apparatus for performing the same.

The objects that could be achieved with the present invention are not limited to what has been particularly described hereinabove and can be inferred from embodiments of the present invention.

Technical Solutions

In one technical aspect of the present invention, provided herein is a method of performing an extended inter-frame space (EIFS) operation by a station (STA) in a wireless LAN system supporting multi-user (MU) transmission, including receiving an MU frame including an SIG-A field and an SIG-B field, if the MU frame triggers the EIFS operation, estimating an ACK transmission time (ACKTxTime) required for transmitting ACK information from other STAs having received the MU frame, when the MU frame causes the EIFS operation, and deferring a channel access for an EIFS time determined based on the estimated ACK transmission time, wherein the estimating the ACK transmission time comprises estimating the ACK transmission time by assuming a lowest MCS level among MCS levels available for the transmission of the ACK information and a minimum RU among RUs available for the transmission of the ACK information.

In another technical aspect of the present invention, provided herein is a station performing an extended inter-frame space (EIFS) operation by a station (STA) in a wireless LAN system supporting multi-user (MU) transmission, the station including a receiver to receive an MU frame including an SIG-A field and an SIG-B field and a processor to estimate an ACK transmission time (ACKTxTime) required for transmitting ACK information from other STAs having received the MU frame when the MU frame causes the EIFS operation and to defer a channel access for an EIFS time determined based on the estimated ACK transmission time, wherein in estimating the ACK transmission time, the processor estimates the ACK transmission time by assuming a lowest MCS level among MCS levels available for the transmission of the ACK information and a minimum RU among RUs available for the transmission of the ACK information.

Preferably, the lowest MCS level available for transmitting the ACK information may be obtained from MCS information on the SIG-B field included in the SIG-A field.

Preferably, the minimum RU available for transmitting the ACK information may include an RU having a smallest frequency resource size among RUs for transmission of the MU frame indicated by resource allocation information included in a common part of the SIG-B field.

Preferably, if failing in decoding of the SIG-A field, the STA may assume that the ACK information is transmitted with MCS 0. If failing in decoding of the SIG-B field, the STA may assume that the ACK information is transmitted in a unit of 26-tone.

Preferably, the STA may assume that the ACK information is transmitted through a same MCS level as that of the SIG-B field and a same RU as that of data of the MU frame.

Preferably, the STA may estimate the ACK transmission time by considering whether the MU frame is configured with a single MAC protocol data unit (MPDU) or multiple MPDUs.

Preferably, the SIG-A field or the SIG-B field may include information indicating whether the ACK information is transmitted through a same RU as that of data of the MU frame.

Preferably, the STA may estimate the ACK transmission time by assuming that a preamble has a length of 56 us, that 1 symbol has a length of 14.4 us, that Block ACK MAC frame has 310 bits, and that at least 2 tones in the minimum RU are used for pilot transmission.

Advantageous Effects

According to one embodiment of the present invention, since EIFS time is determined in consideration of a user performing ACK/BA transmission using a lowest MCS level and a size of a minimum resource unit in multi-user transmission such as OFDMA or MU-MIMO, ACK/BA transmission of other users including hidden nodes can be efficiently protected.

The effects that can be achieved with the present invention are not limited to what has been particularly described hereinabove and can be inferred from embodiments of the present invention.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, the following description relates to a method for efficiently utilizing a channel having a wide bandwidth in a Wireless Local Area Network (WLAN) system and an apparatus therefor. To this end, a WLAN system to which the present invention is applicable will be described first in detail.

Figure 1:
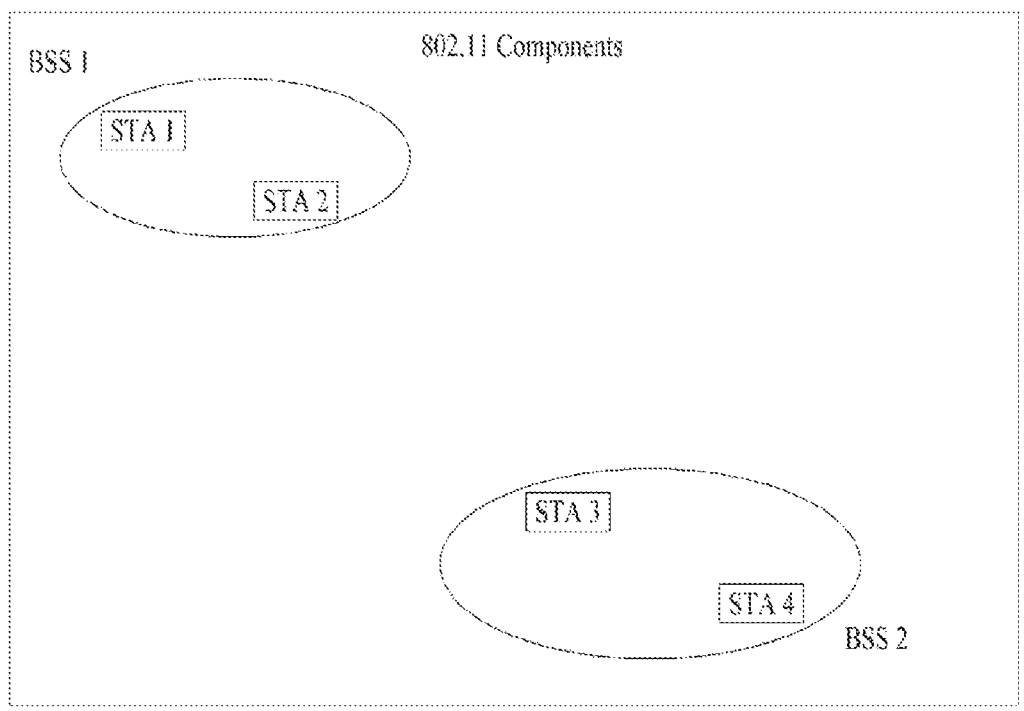
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of Stations (STAs) that are able to communicate with each other by successfully performing synchronization.

An STA is a logical entity including a physical layer interface between a Media Access Control (MAC) layer and a wireless medium. The STA may include an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
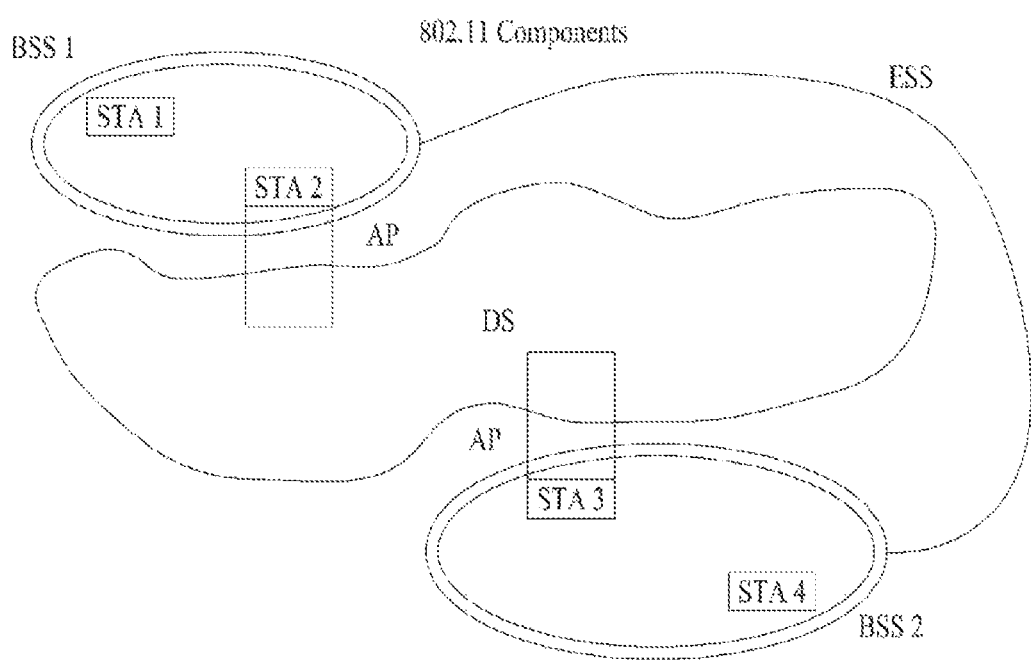
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Block Acknowledgment

Based on the above description, a Block Acknowledgment (ACK) scheme in a WLAN system will be described hereinbelow.

The Block ACK mechanism is a scheme of improving channel efficiency by aggregating and then transmitting a plurality of ACKs in one frame. There are two types of Block ACK mechanism schemes: an immediate ACK scheme and a delayed ACK scheme. The immediate ACK scheme may be suitable for high-bandwidth, low-latency traffic transmission, whereas the delayed ACK scheme is favorable for applications that can tolerate latency. Unless particularly specified otherwise in the below description, an STA that transmits data using the Block ACK mechanism is referred to as an originator and an STA that receives the data using the Block ACK mechanism is referred to as a recipient.

Figures 3, 4:
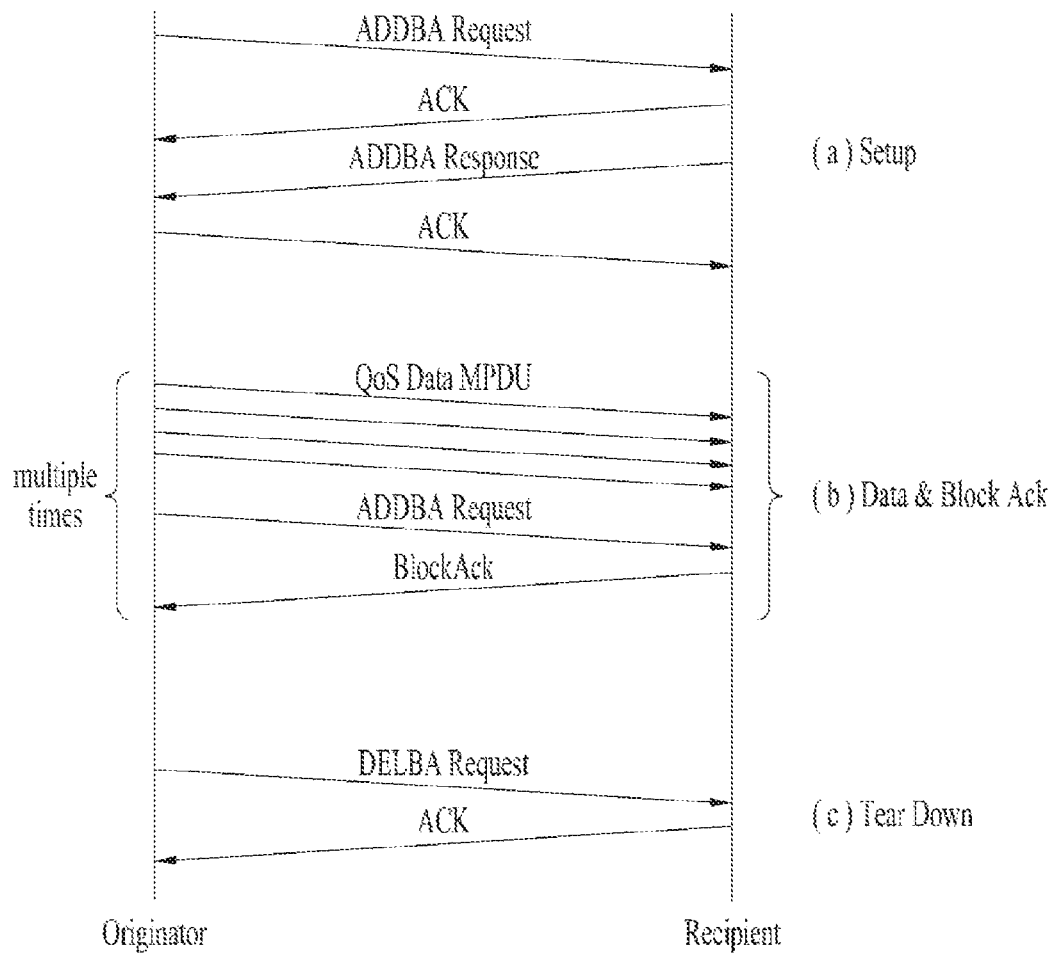
FIG. 3 is diagram for describing a block Ack mechanism used in a wireless LAN system.
FIG. 4 illustrates a basic configuration of a block acknowledgement frame.

FIG. 3 is a diagram illustrating a Block ACK mechanism used in a WLAN system.

The Block ACK mechanism may be initialized by an exchange of Add Block Acknowledgment (ADDBA) request/response frames as illustrated in FIG. 3 ((a) Setup step). After the Block ACK mechanism is initialized, a block of Quality of Service (QoS) data frames may be transmitted by an originator to a recipient. Such a block may be started within a polled Transmission Opportunity (TXOP) or by winning Enhanced Distributed Channel Access (EDCA) contention. The number of frames in the block may be limited. MAC Packet Data Units (MPDUs) in the block of frames may be acknowledged by a BlockAck frame, which is requested by a BlockAckReq frame ((b) Data & Block ACK step).

When the originator has no data to transmit and a final Block ACK exchange is completed, the originator may end the Block ACK mechanism by transmitting a Delete Block Acknowledgment (DELBA) frame to the recipient. Upon receiving the DELBA frame, the recipient may release all resources allocated for Block ACK transfer ((c) Tear Down step).

FIG. 4 is a diagram illustrating a basic configuration of a Block ACK frame.

The Block ACK frame may include a MAC Header field, a Block ACK (BA) Control field, and a BA Information field. The MAC Header field may include a Frame Control field, a Duration/ID field, an RA field, and a TA field. Herein, the RA field represents an address of a receiver STA and the TA field represents an address of a transmitter STA.

Figure 5:
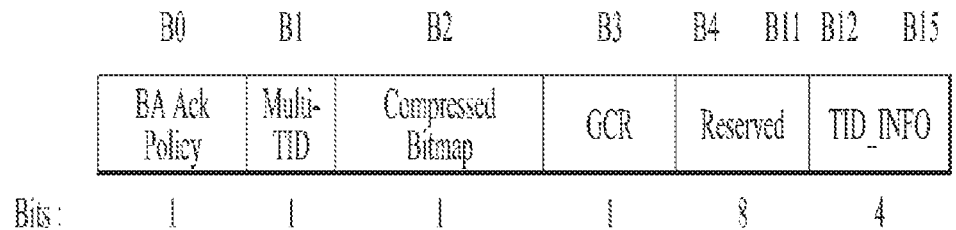
FIG. 5 illustrates a specific configuration of a BA control field shown in FIG. 4.

FIG. 5 is a diagram illustrating a detailed configuration of the BA Control field illustrated in FIG. 4.

A value of a BA ACK Policy subfield in the BA Control field may have the meaning shown in Table 1 below.

TABLE 1

| Value | Meaning |
|---|---|
| 0 | Normal Acknowledgment.<br>The BA Ack Policy subfield is set to this value when the sender requires immediate acknowledgment.<br>The addressee returns an Ack frame.<br>The value 0 is not used for data sent under HT-delayed Block Ack during a PSMP sequence.<br>The value 0 is not used in frames transmitted by DMG STAs. |
| 1 | No Acknoledgment.<br>The addressee sends no immediate response upon receipt of the frame.<br>The BA Ack Policy is set to this value when the sender does not require immediate acknowledgment.<br>The value 1 is not used in a Basic BlockAck frame outside a PSMP sequence.<br>The value 1 is not used in an Multi-TID BlockAck frame. |

Meanwhile, Multi-Traffic Identifier (Multi-TID), Compressed Bitmap, and GCR subfields in the BA Control field may determine possible BlockAck frame variants according to the following regulation.

TABLE 2

| Multi-TID subfield value | Compressed Bitmap subfield value | GCR subfield value | BlockAck frame variant |
|---|---|---|---|
| 0 | 0 | 0 | Basic BlockAck |
| 0 | 1 | 0 | Compressed BlockAck |
| 1 | 0 | 0 | Extended Compressed BlockAck |
| 1 | 1 | 0 | Multi-TID BlockAck |
| 0 | 0 | 1 | Reserved |
| 0 | 1 | 1 | GCR BlockAck |
| 1 | 0 | 1 | Reserved |
| 1 | 1 | 1 | Reserved |

Figure 6:
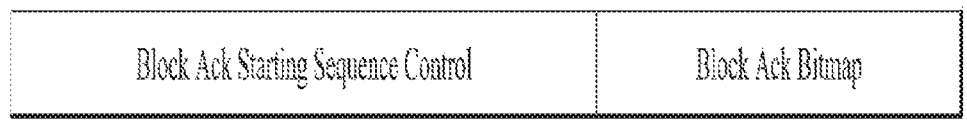
FIG. 6 illustrates a specific configuration of a BA information field shown in FIG. 4.
Figure 7:
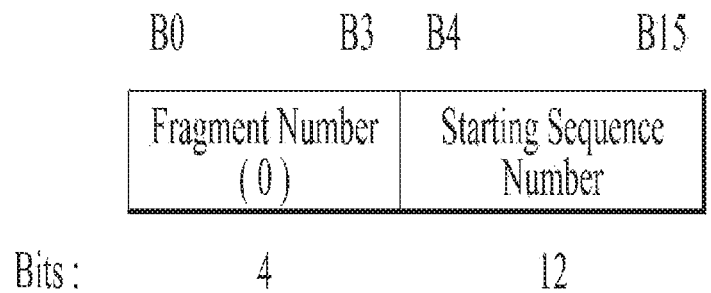
FIG. 7 illustrates a configuration of a block Ack starting sequence control subfield.

FIG. 6 is a diagram illustrating a detailed configuration of the BA Information field illustrated in FIG. 4, and FIG. 7 is a diagram illustrating a configuration of a Block Ack Starting Sequence Control subfield.

As illustrated in FIG. 6, the BA Information field may include a Block Ack Starting Sequence Control (SSC) subfield and a Block Ack Bitmap subfield.

As illustrated in FIG. 6, the Block Ack Bitmap subfield is 128 octets in length and thus may represent a reception status of 64 MAC Service Data Units (MSDUs). If a bit position n of the Block Ack Bitmap subfield is set to 1, this may indicate that an MPDU having an MPDU sequence control value corresponding to (SSC+n) has been successfully received, wherein SSC denotes a value of the Block Ack Starting Sequence Control subfield. In contrast, if the bit position n of the Block ACK Bitmap field is set to 0, this may indicate that the MPDU having the MPDU sequence control value corresponding to (SSC+n) has not been received. Each of values of an MPDU Sequence Control field and the Block Ack Starting Sequence Control subfield may be treated as a 16-bit unsigned integer. For unused fragment numbers of an MSDU, corresponding bits in a bitmap may be set to 0.

Figure 8:
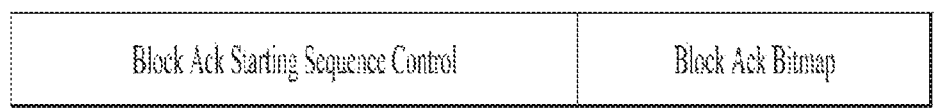
FIG. 8 illustrates a BA information field configuration of a compressed block Ack frame.

FIG. 8 is a diagram illustrating a configuration of a BA Information field of a compressed Block ACK frame As illustrated in FIG. 8, a Block Ack Bitmap subfield of the BA Information field of the compressed Block ACK frame may be 8 octets in length and indicate a reception status of 64 MAC Service data Units (MSDUs) and Aggregate MSDUs (A-MSDUs). The first bit of a bitmap corresponds to an MSDU or an A-MSDU matching a value of a Block Ack Starting Sequence Control subfield and respective bits may sequentially correspond to MSDUs or A-MSDUs after the above MSDU or the A-MSDU.

Figure 9:
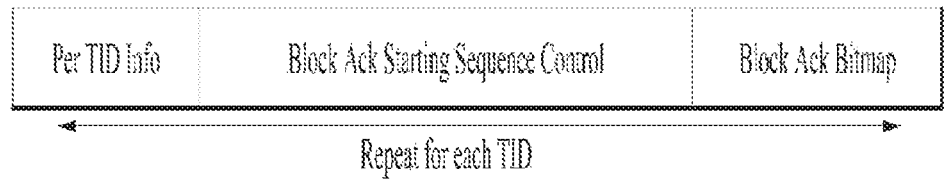
FIG. 9 illustrates a BA information field of a multi-TID block Ack frame.

FIG. 9 is a diagram illustrating a BA Information field of a Multi-TID Block ACK frame.

A TID_INFO subfield of the BA Information field of the Multi-TID Block ACK frame contains information about the number of TIDs in the BA Information field. Specifically, a value of the TID_INFO subfield represents (the number of TIDs corresponding to information of the BA Information field)-1. For example, if the value of the TID_INFO subfield is 2, this may indicate that the BA Information field contains information about three TIDs.

Meanwhile, the Multi-TID Block ACK frame may include a Per TID Info subfield in addition to a Block Ack Starting Sequence Control subfield and a Block Ack Bitmap subfield as illustrated in FIG. 9. The first emerging Per TID Info, Block Ack Starting Sequence Control, and Block Ack Bitmap subfields may be transmitted in correspondence to the lowest TID value and subsequently repeated subfields may correspond to the next TID. A triplet of these subfields may be repeated per TID.

EIFS (Extended Interframe Space) Operation for ACK Protection

As a case that PHY-RXEND.indication primitive for a received frame has an error or MAC FCS value for a received frame is not matched, if it is determined that a medium is in idle state after reception of the corresponding frame, DCF (distributed coordination function) uses EIFS before transmission.

In a similar manner, EDCA mechanism of a station according to HCF uses EIFS−DIFS+AIFS (case of 11ac) interval. Duration of EIFS shall be described later.

If a physical layer indicates that a medium is idle after detection of an error frame, EIFS or EIFS−DIFS+AIFS interval starts. STA does not initiate transmission until EIFS or EIFS−DIFS+AIFS expires. If the STA attempts to initiate transmission after failing to receive a specific frame correctly, EIFS or EIFS−DIFS+AIFS is defined to secure a time enough for another STA (e.g., STA correctly receiving a specific frame) to transmit ACK.

Reception of an errorless frame during EIFS or EIFS−DIFS+AIFS enables an STA to be re-synchronized with a state (e.g., congested/idle state) of a medium actually. Hence, EIFS or EIFS−DIFS+AIFS ends, and a medium access (e.g., DIFS, AIFS or backoff) continues. At the EIFS−DIFS+AIFS end timing, the STA reverts to a physical CS for controlling NAV and a medium access.

If the NAV is updated by a frame that triggers EIFS, the EIFS is not invoked.

DCF Timing Relation

If dynamic EIFS is not activated (e.g., in case that dot11DynamicEIFSActivated is false or not defined), EIFS is derived from SIFS and DIFS and a length of a time taken for ACK frame transmission is determined based on a lowest rate in a physical layer. For example, it is defined as EIFS=aSIFSTime+DIFS+ACKTxTime. ACKTxTime is represented by a unit of microsecond and indicates a time required for ACK frame transmission (e.g., a time taken to send preamble, physical layer header and additional physical layer dependent information at a lowest rate).

If dynamic EIFS is activated (e.g., in case that dot11DynamicEIFSActivated is true), EIFS is determined based on duration of an estimated PPDU. The duration of the estimated PPDU may mean a time for responding to a PPDU having triggered EIFS.

If dynamic EIFS is activated and PPDU having triggered the EIFS fails to include a single MPDU having 14- or 32-octet length, the EIFS is defined as EIFS=aSIFSTime+EstimatedACKTxTime+DIFS. EstimatedACKTxTime is determined based on duration of an estimated PPDU. The duration of the estimated PPDU may mean a time for responding to the PPDU having triggered the EIFS and is defined by Table 3. In Table 3, EstimatedACKTxTime is determined according to the attribute having triggered EIFS.

Figure 10:
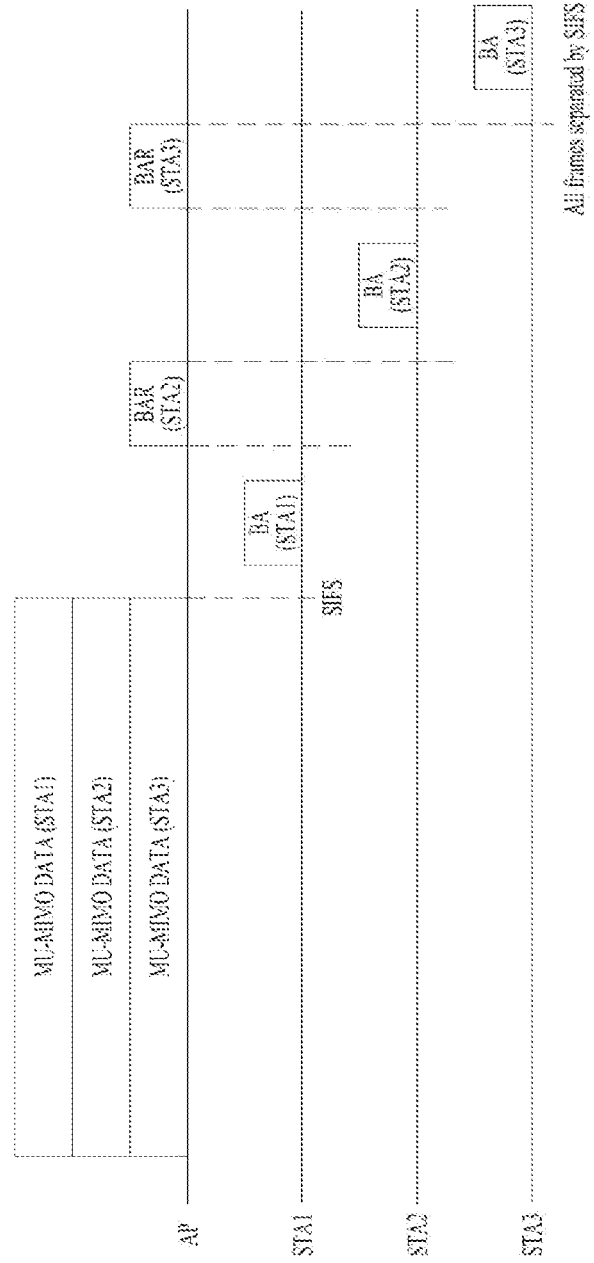
FIGS. 10 and 11 are diagrams for describing a case in which a block Ack mechanism is applied to downlink MU-MIMO.
Figure 11:
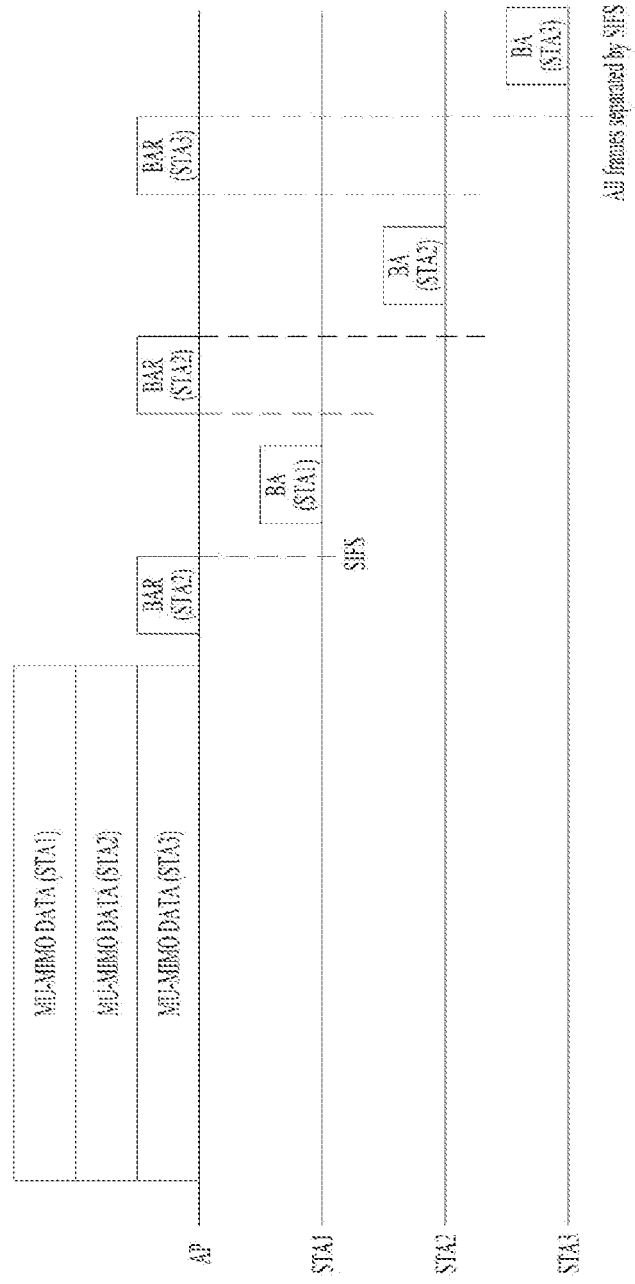

FIGS. 10 and 11 are diagrams illustrating a case in which a Block ACK mechanism is applied to a Downlink (DL) Multi-User Multiple Input Multiple Output (MU-MIMO) scheme.

As illustrated in FIGS. 10 and 11, an AP may transmit MU-MIMO data frames to a plurality of STAs, STA 1 to STA 3.

It is assumed in FIG. 10 that frame exchange is performed after a Short InterFrame Space (SIFS) after an MU PLCP Packet Data Unit (PPDU) is transmitted. It is also assumed in FIG. 10 that for STA1, an implicit Block Ack request is configured as Ack policy and, for STA 2 and STA 3, a Block ACK is configured as Ack policy. Then, STA 1 may immediately transmit a BA frame after receiving a DL MU PPDU even without receiving a request for the Block ACK. In contrast, the AP may perform polling by transmitting a BA Request (BAR) frame to STA 2 and STA 3 and then STA 2 and STA 3 may transmit BA frames.

Meanwhile, FIG. 11 illustrates an example of performing a frame exchange without an SIFS after an MU PPDU is transmitted and it is assumed that a Block ACK is configured as ACK policy for all STAs. Therefore, the AP may perform polling by transmitting a BAR frame to all STAs.

Example of HE PPDU

A description will be given of examples of an HE PPDU (High Efficiency Physical layer Protocol Data Unit) format in a wireless LAN system supporting 11ax.

Figure 12:
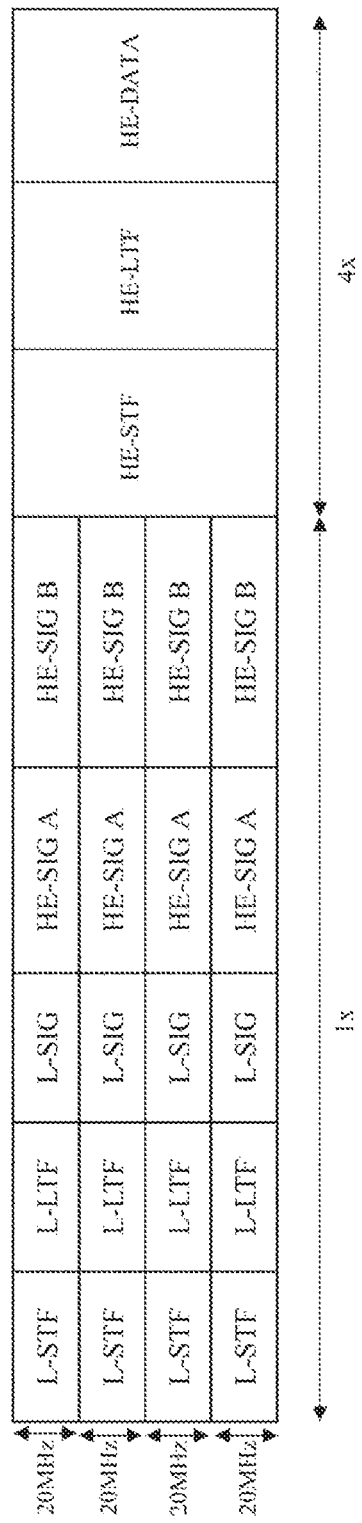
FIG. 12 illustrates an example of an HE PPDU.

FIG. 12 illustrates an example of an HE PPDU. Referring to FIG. 12, an HE-SIG A (or HE-SIG1) field follows an L-Part (e.g., L-STF, L-LTF, L-SIG) and is duplicated in units of 20 MHz like the L-Part. HE-SIG A includes common control information (e.g., BW, GI length, BSS index, CRC, Tail, etc.) for STAs. The HE-SIG A field includes information for analyzing the HE PPDU and thus information included in the HE-SIG A field may depend on the format of the HE PPDU (e.g., SU PPDU, MU PPDU or trigger based PPDU). For example, in an HE SU PPDU format, the HE-SIG A field may include at least one of a DL/UL indicator, an HE PPDU format indicator, a BSS color, a

TABLE 3

| Modulation of PPDU causing EIFS | Rate/MCS of PPDU causing EIFS | Other properties of PPDU causing EIFS | Presumed response | Presumed response rate | EstimatedAckTxTime (μs) |
|---|---|---|---|---|---|
| (HR-)DSSS | 1 Mb/s | | Ack | 1 Mb/s | 304 |
| (HR-)DSSS | ≥2 Mb/s (long preamble) | | Ack | 2 Mb/s | 248 |
| (HR-)DSSS | ≥2 Mb/s (short preamble) | | Ack | 2 Mb/s | 152 |
| (ERP-)OFDM | BPSK | | Ack | 6 Mb/s | 44 |
| (ERP-)OFDM | QPSK | | Ack | 12 Mb/s | 32 |
| (ERP-)OFDM | ≥16-QAM | | Ack | 24 Mb/s | 28 |
| HT | BPSK | Aggregation = 0 | Ack | 6 Mb/s | 44 |
| HT | QPSK | Aggregation = 0 | Ack | 12 Mb/s | 32 |
| HT | ≥16-QAM | Aggregation = 0 | Ack | 24 Mb/s | 28 |
| HT | BPSK | Aggregation = 1 | BlockAck | 6 Mb/s | 68 |
| HT | QPSK | Aggregation = 1 | BlockAck | 12 Mb/s | 44 |
| HT | ≥16-QAM | Aggregation = 1 | BlockAck | 24 Mb/s | 32 |

If dynamic EIFS is activated and PPDU having triggered the EIFS includes a single MPDU having 14- or 32-octet length, the EIFS is equal to DIFS. This is because it is highly possible that a single MPDU having 14- or 32-octet length is ACK or BA frame. And, in case of ACK or BA frame, transmission of response PPDU is not triggered.

TXOP duration, a BW (bandwidth), an MCS, CP+LTF length, coding information, the number of streams, STBC (e.g., whether STBC is used), Tx beamforming (TxBF) information, CRC, and Tail. In the case of HE SU PPDU format, an HE-SIG B field can be omitted. In the HE MU PPDU format, the HE-SIG A field may include at least one of a DL/UL indicator, a BSS color, a TXOP duration, a BW (bandwidth), MCS information of the SIG B field, the number of symbols of the SIG B field, the number of HE LTF symbols, an indicator indicating whether full-band MU-MIMO is used, CP+LTF length, Tx beamforming (TxBF) information, CRC and Tail. In an HE trigger-based PPDU format, the HE-SIG A field may include at least one of a format indicator (e.g., indicator indicating SU PPDU or trigger based PUDU), a BSS color, a TXOP duration, a BW, CRC and Tail.

According to an embodiment, one HE-SIG B field can be transmitted in the case of a bandwidth which does not exceed 20 MHz. In the case of a bandwidth exceeding 20 MHz, first type HE-SIG B (referred to as HE-SIG B [1] hereinafter) or second type HE-SIG B (referred to as HE-SIG B [2]) can be transmitted over 20 MHz channels. For example, HE-SIG B [1] and HE-SIG B [2] may be alternately transmitted. HE-SIG B [1] may be transmitted over an odd-numbered 20 MHz channel and HE-SIG B [2] may be transmitted over an even-numbered 20 MHz channel. More specifically, in the case of 40 MHz bandwidth, HE-SIG B [1] is transmitted over the first 20 MHz channel and HE-SIG B [2] is transmitted over the second 20 MHz channel. In the case of 80 MHz bandwidth, HE-SIG B [1] is transmitted over the first 20 MHz channel, HE-SIG B [2] is transmitted over the second 20 MHz channel, the same HE-SIG B [1] is transmitted over the third 20 MHz channel and the same HE-SIG B [2] is transmitted over the fourth 20 MHz channel. The same applies to 160 MHz bandwidth.

HE-SIG B may include a common field and a user specific field. The common field may precede the user specific field. The common field and the user specific field can be identified in units of bits instead of OFDM symbols.

The common field of HE-SIG B includes information about all STAs designated to receive a PPDU in the corresponding bandwidth. The common field may include RU (Resource Unit) allocation information. HE-SIG B [1] fields have the same contents and HE-SIG B [2] fields have the same contents. For example, when four 20 MHz channels constituting 80 MHz are identified as [LL, LR, RL, RR], the common field of HE-SIG B [1] may include a common block for LL and RL and the common field of HE-SIG B [2] may include a common block for LR and RR.

The user specific field of HE-SIG B may include a plurality of user fields and each user field may include information specific to an individual STA designated to receive a PPDU. For example, the user field may include at least one of a station ID, an MCS per STA, the number of streams, Nsts, coding (e.g., indication for usage of LDPC), a DCM indicator and Tx beamforming information. However, the user field is not limited thereto.

UL MU Transmission

Figure 13:
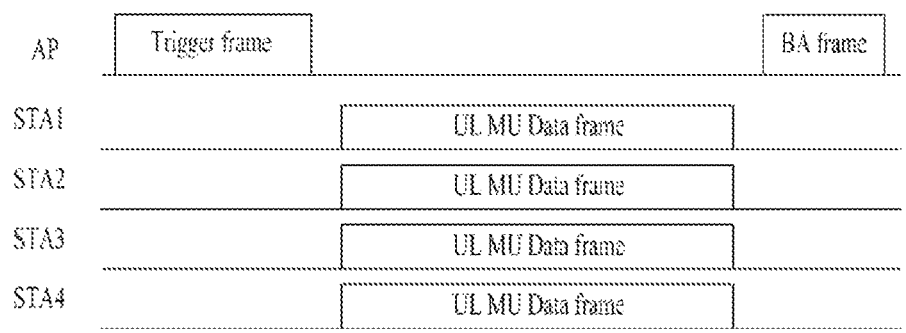
FIG. 13 is a diagram to describe an uplink multi-user transmission situation according to one embodiment.

FIG. 13 is a diagram for describing an uplink multi-user transmission situation according to an embodiment of the present invention.

As described above, the UL MU transmission scheme can be used in an 802.11ax system and can be started when an AP transmits a trigger frame to a plurality of STAs (e.g., STA 1 to STA 4), as shown in FIG. 13. The trigger frame may include UL MU allocation information. For example, the UL MU allocation information may include at least one of resource position and size, STA IDs or Rx STAs addresses, an MCS, and MU type (MIMO OFDMA and the like). Specifically, the trigger frame includes at least one of (i) UL MU frame duration, (ii) the number of allocations, N, and (iii) information on each allocation. Information on each allocation may include per user Info. For example, information on each allocation may include at least one of an AID (in the case of MU, as many AIDs as the number of STAs are added), power adjustment, resource (or tone) allocation information (e.g., bitmap), an MCS, the number of streams, Nsts, STBC, coding, and Tx beamforming information.

As illustrated in FIG. 13, the AP can acquire TXOP through which the trigger frame will be transmitted through a contention procedure for accessing a medium. STAs can transmit UL data frames in a format indicated by the AP after SIFS of the trigger frame. It is assumed that the AP according to embodiments of the present invention performs acknowledgment for UL MU data frames through a BA (Block ACK) frame.

Figure 14:
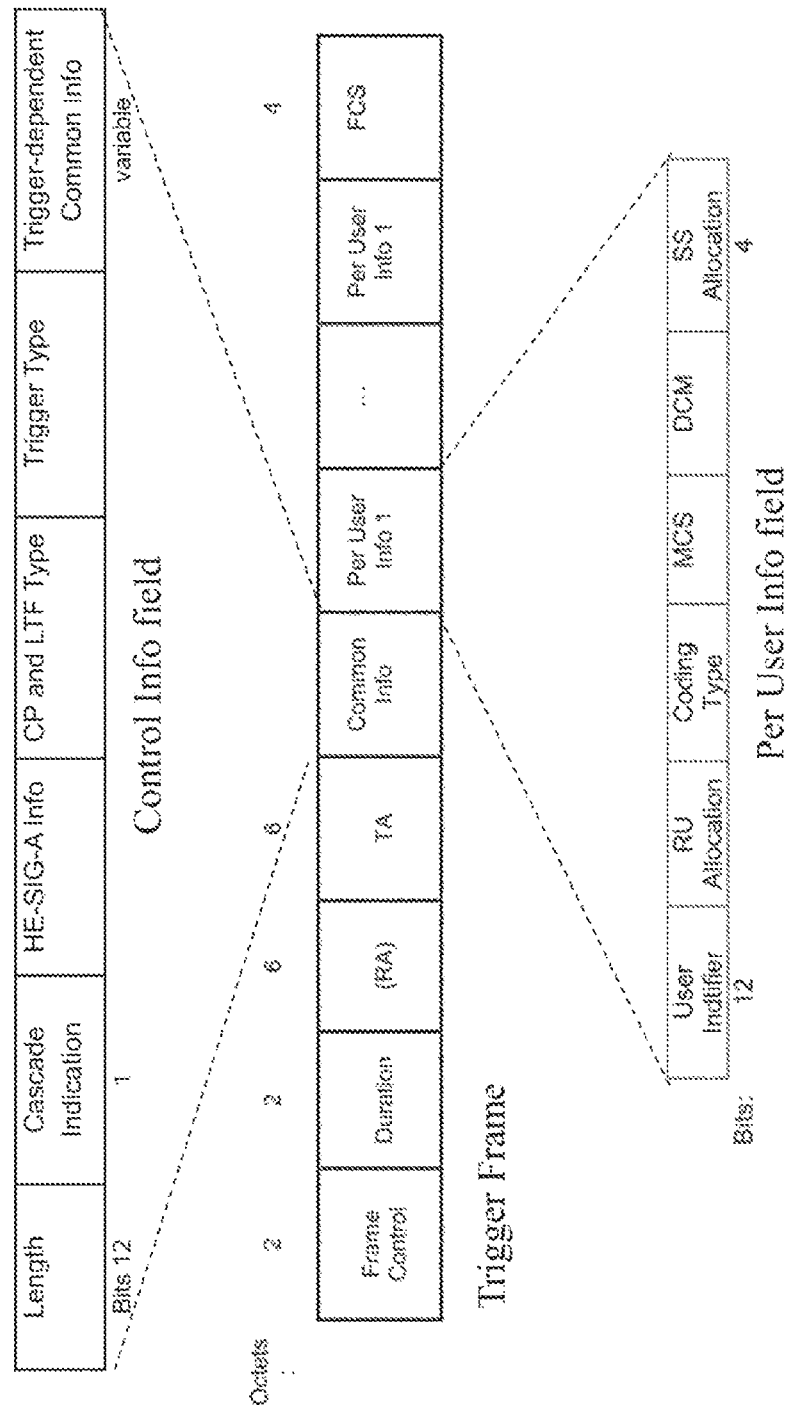
FIG. 14 shows a trigger frame format according to one embodiment.

FIG. 14 illustrates a trigger frame format according to an embodiment of the present invention.

Referring to FIG. 14, a trigger frame may include at least one of a frame control field, a duration field, an RA (recipient STA address) field, a TA (transmitting STA address) field, a common information field, one or more individual user information (Per User Info) fields and FCS (Frame Check Sum). The RA field indicates the address or ID of a recipient STA and may be omitted according to embodiments. The TA field indicates the address of a transmitting STA.

The common information field may include at least one of a length subfield, a cascade indication, an HE-SIG A information subfield, a CP/LTF type subfield, a trigger type subfield and a trigger-dependent common information subfield. The duration subfield indicates an L-SIG duration of a UL MU PPDU. The cascade indication indicates whether there is transmission of a trigger frame following the current trigger frame. The HE-SIG A information subfield indicates content included in HE-SIG A of the UL MU PPDU. The CP/LTF type subfield indicates a CP and an HE LTF type included in the UL MU PPDU. The trigger type subfield indicates the type of a trigger frame. The trigger frame may include common information specific to the corresponding type and type specific individual user information (Per User Info). For example, the trigger type may be set to any one of a basic trigger type (e.g., type 0), a beamforming report poll trigger types (e.g., type 1), a MU-BAR (Multi-user Block Ack Request) type (e.g., type 2) and a MU-RTS (multi-user ready to send) type (e.g., type 3). However, the trigger type is not limited thereto. When the trigger type is MU-BAR, the trigger-dependent common information subfield may include a GCR (Groupcast with Retries) indication and a GCR address.

The individual user information field (Per User Info field) may include at least one of a user ID subfield, an RU (resource unit) allocation subfield, a coding type subfield, an MCS field, a DCM (dual sub-carrier modulation) subfield, an SS (spatial stream) allocation subfield and a trigger dependent Per User Info subfield. The user ID subfield indicates the AID of an STA which will use the corresponding resource unit for transmitting MPDU of UL MU PPDU. The RU allocation subfield indicates a resource unit used by the corresponding STA to transmit the UL MU PPDU. The coding type subfield indicates the coding type of the UL MU PPDU transmitted by the corresponding STA. The MCS subfield indicates the MCS used by the corresponding STA to transmit the UL MU PPDU. The DCM subfield indicates information about double carrier modulation of the UL MU PPDU transmitted by the corresponding STA. The SS allocation subfield indicates information about spatial streams of the UL MU PPDU transmitted by the corresponding STA.

When the trigger type is MU-BAR, the trigger dependent Per User Info subfield may include BAR control and BAR information.

Figure 15:
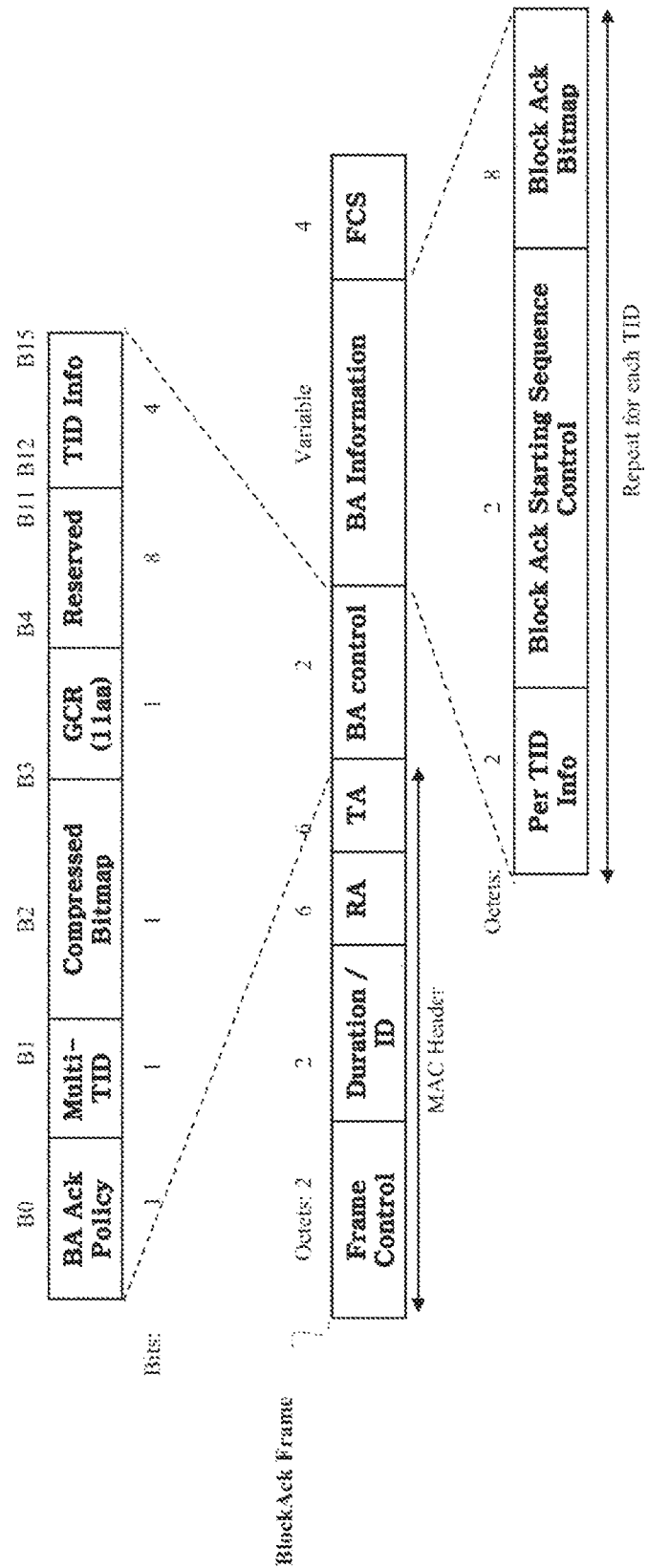
FIG. 15 shows a Multi-STA BA frame format according to one embodiment.

FIG. 15 illustrates a multi-STA BA (referred to as M-BA hereinafter) frame format according to an embodiment of the present invention. An M-BA Frame can be set to a format obtained by modifying part of a multi-TID BlockAck frame. The M-BA frame may be modified in such a manner that the M-BA frame includes an indicator indicating that the corresponding frame is an M-BA frame, a BA information field in the M-BA frame is addressed to different STAs, and bits #0 to #10 (i.e., B0 to B10) of a Per TID information field of the M-BA frame are set to the ID (e.g., PAID or AID) of a receiver which will receive the corresponding BA information field. In this manner, the BA information field including the Per TID information field is specifically set to an individual STA, and thus the BA information field can be provided per STA.

Signaling indicating ACK in the M-BA can be defined as follows. When bit #11 (B11) of the TID information field (Per TID Info field) is set to a specific value (e.g., 0), a BlockAck (BA) bitmap and a BlockAck starting sequence control (BA SC) subfield are not provided in the BA information field and the BA information field can indicate ACK (e.g., successful reception) for an STA having the AID indicated by the TID information field. If bit #11 of the TID information field is set to another value (e.g., 1), the BA bitmap and the BA SC subfield can be provided in the BA information field.

In UL MU transmission scheme, an AP simultaneously transmits Block ACKs for reception of UL MU frames to several UEs. In doing so, since the AP can perform the transmission using Multi-TID Block ACK format and the Multi-TID Block ACK format contains Block ACK information on several UEs, a Block ACK transmission length may become longer than Estimated ACKTxTime used for EIFS. Hence, the Block ACK transmission length may get longer than ACK TxTime of an existing EIFS. OFDMA ACK/BA may be sent instead of Multi-STA Block ACK.

DL MU Transmission

Figure 16:
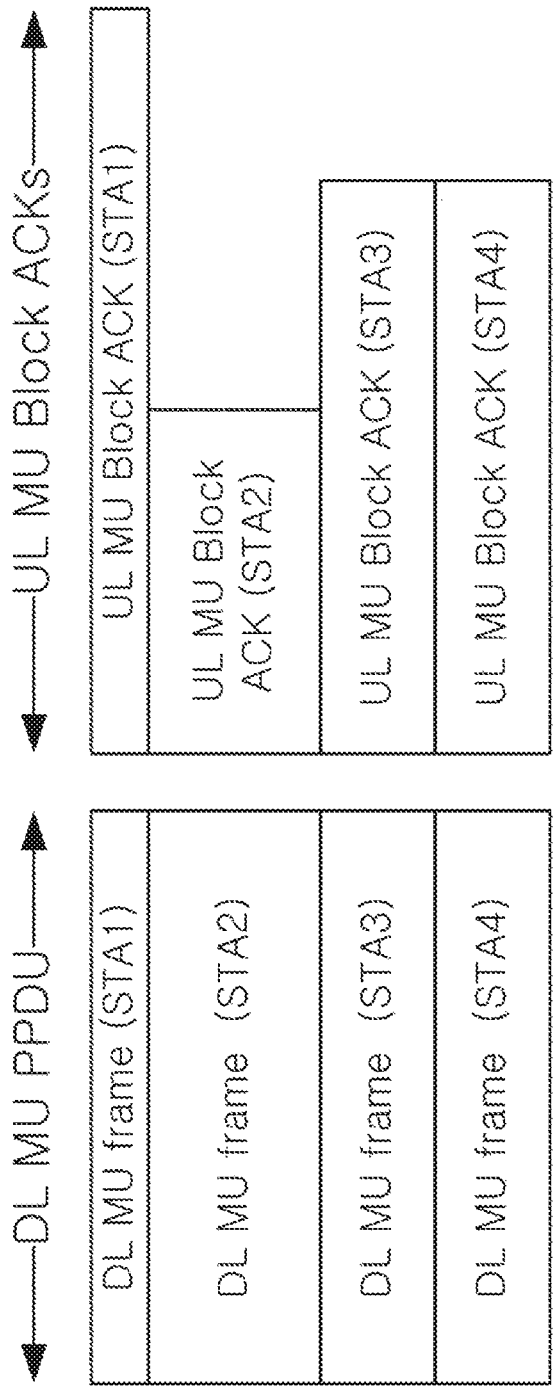
FIG. 16 shows an example of DL MU transmission.

FIG. 16 shows an example of DL MU transmission.

In a DL MU (OFDMA/MU-MIMO) procedure shown in FIG. 16, STAs receive DL MU frames and can transmit ACK/Block ACK in MU form in response to the received frames. In doing so, the STAs are aware of a transmission region implicitly or the transmission region may be explicitly signaled to UEs. If several UEs transmit UL ACK/BA by dividing frequency, since an STA having a small transmission region allocated thereto should use a small resource, a duration of Block ACK frame transmitted by the corresponding STA is elongated. Hence, the duration of Block ACK frame transmitted by the corresponding STA may get longer than EstimatedACKTxTime used by an existing EIFS and a transmitted ACK/BA may not be protected by hidden nodes.

Dynamic EIFS for MU Procedure

In the following description, embodiments for minimizing AC transmission failure possibly caused by hidden nodes in an MU procedure are described.

HE(11ax) STA of which use of dynamic EIFS is activated can determine EstimatedACKTxTime based on the following embodiments. The proposed methods are applicable to MU(OFDMA/MU-MIMO) PPDU, by which the scope of a right of the present invention is non-limited.

1. EIFS Operation for Protecting UL MU ACK for DL MU Frame (1) Method 1: ACK Frame Transmission Time on Assumption of Worst Case According to one embodiment of the present invention, a time requires for ACK frame transmission (e.g., EstimatedACKTxTime) can be calculated in consideration of a worst case. The worst case means a case that a longest time is consumed for ACK frame transmission and may include a case that ACK frame is transmitted with a smallest resource unit and a lowest MCS level. Particularly, Worst Case may include a combination of 26 tons and MCS0.

For example, assuming that an STA performing EIFS operation (hereinafter named an EIFS operation STA) receives a specific frame (e.g., a frame triggering EIFS), the EIFS operation STA should consider a fact that the specific frame may be correctly received by a different STA. If the different STA correctly receives the specific frame and transmits ACK frame, the EIFS operation STA needs to secure a time for the different STA to transmit the ACK frame. Hence, the EIFS operation STA estimates a time taken for the different STA to transmit the ACK frame. And, the EIFS operation STA can calculate an ACK transmission time on the assumption that the ACK frame can be transmitted with a smallest resource unit (RU) and a lowest MCS level. For example, the EIFS operation STA calculates the ACK transmission time by considering that Block ACK is modulated/coded with MCS0 and transmitted through 26-tone unit.

Particularly, in order to exemplarily show an ACK transmission time calculating method, the items shown in Table 4 are assumed.

TABLE 4

Preamble = L-preamble + HE-preamble: 56 us
L-preamble: L-STF (8 us) + L-LTF (8 us) + L-SIG (4 us) = 20 us
HE-preamble: RL-SIG (4 us) + HE-SIG-A (8 us) + HE-STF (8 us) + HE-LTF(16 us) = 36 us
Block ACK MAC frame: 39 octets − 2 bits = 310 bits
Block ACK MAC frame = Service field(2 octets) + MPDU delimiter(4 octets) + MAC header(16 octets) + BA control(2 octets) + BA information (10 octets) + FCS(4 octets) + tail(6 bits)
ACK MAC frame: 21 octets − 2 bits = 166 bits
ACK MAC frame = Service field(2 octets) + MPDU delimiter(4 octets) + ACK frame(14 octets) + tail(6 bits)
1 Symbol length: 12.8 + 1.6 CP = 14.4 us
Resource allocation: MCS 0, 26 tones unit (data: 24, pilot: 2)

According to the assumption as Table 4, it can be calculated into EstimatedACKTxTime=Ceiling [310/12]*14.4+ 56 (us)=430.4 (us). For example, when MCS 0 corresponds to BPSK and coding rate 1/2, as 1 bit is ½ coded, 2 bits are outputted. If the 2 bits are modulated, 2 modulated symbols are generated. Namely, according to MCS0, 310 bits (e.g., Block ACK MAC frame) correspond to 620 modulated symbols (e.g., data symbols). Moreover, since 2 tones among 26 tones are used for pilot signal transmission, total 24 tones are usable for data symbol transmission. Eventually, if 620 modulated symbols are mapped to a frequency axis by 24-tone unit, PFDM symbols of which number amounts to Ceiling [620/24=310/12)] are used on a time axis. Assuming that 1 OFDM symbol length is 14.4 us, Ceiling [310/12]*14.4 us is required for MAC frame (e.g., Block ACK MAC frame) transmission. As 56 us is consumed for transmission of PHY preamble attached to a MAC frame head, it can be calculated as EstimatedACKTxTime=Ceiling [310/12]*14.4+56 (us)=430.4 (us).

STA will calculate EIFS by setting EstimatedACKTx-Time to 430.4 (us). In order to facilitate EIFS calculation, the STA may set EstimatedACKTxTime to one of 430 and 431 (us). Such EIFS calculation is based on the assumption as Table 4. If assumption is changed, EstimatedACKTxTime can be set to a different value. For example, in case of changing a preamble size, using a compressed MAC header for ACK or Block ACK frame, or changing a size of MAC frame due to omitting MPDU delimiter, a total length can be changed.

(2) Method 2: HE-SIG A Based EstimatedACKTxTime Calculation

According to one embodiment of the present invention, EstimatedACKTxTime can be calculated based on at least one portion of information contained in HE-SIG A.

For clarity, assume that the items assumed in Table 4 are identically applied.

An EIFS operation STA can calculate EstimatedACKTxTime based on MCS information of HE-SIG B contained in HE-SIG A of a frame having triggered EIFS. Since HE-SIG A contains information on MCS level applied to HE-SIG B, the EIFS operation STA can estimate EstimatedACKTxTime based on the MCS level applied to HE-SIG B. For example, assuming that MCS level equal to the MCS level applied to HE-SIG B of the EIFS triggering frame is applied to ACK or Block ACK frame, the EIFS operation STA can calculate a time EstimatedACKTxTime required for ACK or Block ACK frame transmission. In doing so, the EIFS operation STA can assume a resource unit, on which the ACK or Block ACK frame is transmitted, as a specific value. For example, EstimatedACKTxTime can be calculated with reference to 26-tone unit that is a minimum RU.

In transmitting UL ACK after receiving DM MU frame (e.g., frame having triggered EIFS), STAs other than the EIFS operation STA can transmit ML MU ACK or Block ACK using MCS applied to HE-SIG B of DL MU frame.

Table 5 shows one example of an EstimatedACKTxTime calculating method.

Thus, when the EIFS operation STA correctly decodes HE-SIG A of the EIFS triggering frame, it is able to calculate EstimatedACKTxTime based on MCS level applied to HE-SIG B included in HE-SIG A.

(3) Method 3: HE-SIG B Based EstimatedACKTxTime Calculation

According to one embodiment of the present invention, an EIFS operation STA can calculate EstimatedACKTxTime using at least one portion of information contained in HE-SIG B. For clarity, the same items shown in Table 4 assumed.

If the EIFS operation STA correctly decodes HE-SIG A of PPDU having triggered EIFS and obtains total RU (resource unit) allocation information by decoding a user common part of HE-SIG B, the EIFS operation STA calculates EstimatedACKTxTime of EIFS based on RU allocation information contained in the HE-SIG B common part.

For example, the EIFS operation STA can calculate EstimatedACKTxTime based on the MCS information applied to HE-SIG B described in the method 2 and the RU allocation information obtained from the HE-SIG B common part.

The EIFS operation STA can calculate EstimatedACKTxTime by assuming that ACK/BA is transmitted through the same frequency resource as resource allocation of a current MU PPDU (e.g., an EIFS triggering PPDU). The EIFS operation STA can calculate EstimatedACKTxTime based on an RU of a minimum unit among RUs allocated through RU allocation information. For example, if 52-tone unit and 108-tone unit are allocated by RU allocation information, the EIFS operation STA calculates EstimatedACKTxTime using the 52-tone unit. If 26-tone unit, 52-tone unit, 108-tone unit and 242-tone unit are allocated by RU allocation information, the EIFS operation STA calculates EstimatedACKTxTime using the 26-tone unit that is the smallest RU among the units.

An RU having a smallest size among allocated RUs shall be named MIM frequency RU (minimum Frequency

TABLE 5

| Type of PPDU causing EIFS | Rate/MCS of HE-SIG B of PPDU causing EIFS | Other properties of PPDU causing EIFS | Presumed response | Presumed response rate (Mbps) | EstimatedAckTxTime (us) |
| --- | --- | --- | --- | --- | --- |
| UL MU ACK | BPSK | Single MPDU | ACK | 6 | 257.6 (or 257 or 258) |
| | QPSK | | ACK | 12 | 156.8 (or 156 or 157) |
| | >=16-QAM | | ACK | 24 | 113.6 (or 113 or 114) |
| | BPSK | Multiple MPDUs | BlockACK | 6 | 430.4 (or 430 or 431) |
| | QPSK | | BlockACK | 12 | 243.2 (or 243 or 244) |
| | >=16-QAM | | BlockACK | 24 | 156.8 (or 156 or 157) |

The EIFS operation STA can calculate EstimatedACKTxTime based on MCS information applied to HE-SIG B like Table 5. When the EIFS operation STA knows whether a current PPDU (e.g., an EIFS triggering frame) is configured with a single MPDU or multiple MPDUs, Table 5 shows an example of describing EstimatedACKTxTime for each case.

If the EIFS operation STA is unable to know whether the EIFS triggering frame has a single MPDU or multiple MPDUs, the EIFS operation STA determines EstimatedACKTxTime by assuming Block ACK (i.e., multiple MPDUs). Namely, the EIFS operation STA can determine EstimatedACKTxTime by assuming a case that ACK transmission for the EIFS triggering frame may become the longest.

Resource Unit). Frequency RU defined in HE system may include 26-, 52-, 106-, 242-, 484-, and 996-tone units. Yet, for clarity, the present embodiment is described on the assumption of 26-, 52- and 106-tone units. The 26-tone unit is assumed as including 2 pilot tones. The 52-tone unit is assumed as including 4 pilot tones. The 106-tone unit is assumed as including 4 pilot tones. The 242-tone unit is assumed as including 8 pilot tones. The 484-tone unit is assumed as including 16 pilot tones. The 996-tone unit is assumed as including 32 pilot tones.

Table 6 shows one example of an EstimatedACKTxTime calculating method in consideration of MCS information of HE-SIG B and MIM frequency RU information.

TABLE 6

| ACK/BA policy |
| --- |
| 0: Only OFDMA ACK |
| 1: OFDMA BA (OFDMA ACK may be included) |
| 2: M-BA (legacy PPDU format) |
| 3: Full bandwidth M-BA (HE SU PPDU format) |
| 4: OFDMA M-BA (242 tones unit based) |
| 5: DL data frame |

If the EIFS operation STA fails to obtain information of a common part of JE-SIG B (e.g., in case that it is unable to decode HE-SIG B in an EIFS triggering PPDU), the EIFS operation STA may calculate EstimatedACKTxTime of EIFS operation using at least one of the method 1 and the method 2. For example, the EIFS operation STA may calculate EstimatedACKTxTime using MCS information (e.g., information indicating MCS applied to HE-SIG B as MCS information included in HE-SIG A) of HE-SIG B by the method 2.

On the other hand, the EIFS operation STA may calculate EstimatedACKTxTime using MCS information (e.g., MCS level applied to MAC frame) included in HE-SIG B common part.

(4) Method 3-1: EstimatedACKTxTime Calculation Based on Information on Frequency Resource of ACK/BA According to one embodiment of the present invention, information, which indicates whether ACK/BA supposed to be transmitted is transmitted on the same RU of a frequency resource of a current DL MU PPDU (e.g., an EIFS triggering PPDU), can be included in HE-SIG. Preferably, the corresponding information is transmitted through a common part of HE-SIG B including resource allocation information or HE-SIG A in HE-SIG.

If it is indicated that ACK/BA is transmitted through the same RU of the current DL MU PPDU, an EIFS operation STA can calculate EstimatedACKTxTime using the method 3.

On the contrary, if it is indicated that ACK/BA is not transmitted through the same RU of the current DL MU PPDU, the EIFS operation STA can calculate EstimatedACKTxTime using one of the method 1 and the method 2.

Figure 17:
FIG. 17 shows an example of a common part of HE-SIG B according to one embodiment of the present invention.

FIG. 17 shows an example of a common part of HE-SIG B according to one embodiment of the present invention.

Referring to FIG. 17, a common part of HE-SIG B includes ACK Same Frequency Indication information. ACK Same Frequency Indication indicates whether UL MU ACK is transmitted with the same location (and/or the same size) of a frequency resource on which DL MU PPDU is transmitted.

ACK Same Frequency Indication may be defined as another name. For example, ACK Same Frequency Indication may be referred to as trigger frame inclusion.

Trigger frame inclusion indicates whether Trigger frame is included in a corresponding PPDU. If Trigger frame is included, since a location and size of ACK resource can be assigned by Trigger frame, an EIFS operation STA fixes RU by 26-tone unit and is able to calculate EstimatedACKTxTime using BPSK like the method 1 or MCS of HE-SIG B like the method 2.

This may be regarded as ACK Trigger frame inclusion. Namely, (ACK) Trigger frame inclusion can indicate whether Trigger frame for ACK transmission is included in the corresponding PPDU. The EIFS operation STA determines that RU of ACK/BA has the same location and size of the frequency resource of DL MU PPDU only if Trigger frame is not included. Then, the EIFS operation STA can calculate EstimatedACKTxTime.

Meanwhile, if failing to obtain information such as (ACK) Trigger frame inclusion, the EIFS operation STA can calculate EstimatedACKTxTime by assuming 26-tone unit.

The aforementioned examples (Methods 1 to 3) are identically applicable to a cascade structure (i.e., DL MU PPDU+SIFS+(UL MU ACK+UL MU Data)) as well as to the [DL MU PPDU+SIFS+UL MU ACK] structure, and the aforementioned embodiments can be used to protect UL MU ACK at least.

2. EIFS Operation for Protecting DL MU ACK for UL MU Frame

In the following, based on the aforementioned discussions, an EIFS operation for protecting DL MU ACK (e.g., OFDMA BA, Multi-STA BA, or OFDMA M-BA) for UL MU PPDU is described.

According to one embodiment, HE-SIG A of UL MU PPDU may include information (i.e., ACK Policy information) indicating whether ACK for UL MU PPDU is OFDMA ACK, OFDMA BA, or M-BA (Multi-STA Block ACK).

ACK Policy information may be transmitted by being contained in Common Information of Trigger frame. For example, when STAs transmit UL MU PPDU, they transmit it in a manner that ACK Policy is contained in HE-SIG A.

Table 7 shows an example of ACK Policy of HE-SIG A.

TABLE 7

| ACK/BA policy |
| --- |
| 0: Only OFDMA ACE |
| 1: OFDMA BA (OFDMA ACK may be included) |
| 2: M-BA (legacy PPDU format) |
| 3: Full bandwidth M-BA (HE SU PPDU format) |
| 4: OFDMA M-BA (242 tones unit based) |
| 5: DL data frame |

If ACK Policy is OFDMA ACK, an EIFS operation STA can calculate EstimatedACKTxTime based on ACK MAC frame size, MCS 0 and 26-tone unit. For example, the calculated EstimatedACKTxTime may be 269.6 (or 269 or 270) us.

If ACK Policy is OFDMA BA, the EIFS operation STA can calculate EstimatedACKTxTime based on Block ACK MAC frame size, MCS 0 and 26-tone unit. For example, the calculated EstimatedACKTxTime may be 442.4 (or 442 or 443) us.

If ACK Policy is M-BA (legacy PPDU format), the EIFS operation STA can calculate EstimatedACKTxTime based on M-BA frame size considering the maximum number of STAs (e.g., STAs transmitting UL MU PPDU), MCS0, and 20 MHz (11a PPDU format).

If ACK Policy is HE SU PPDU based M-BA (full bandwidth), the EIFS operation STA can calculate EstimatedACKTxTime in consideration of M-BA frame size considering the maximum number of STAs (e.g., STAs transmitting UL MU PPDU), MCS0 and HE SU PPDU format on a determined bandwidth.

If ACK Policy is OFDMA M-BA (242-tone unit), the EIFS operation STA can calculate EstimatedACKTxTime in consideration of M-BA frame size considering the maximum number of STAs in 242-tone unit, MCS0, and 242-tone unit.

If ACK Policy is DL data frame, the EIFS operation STA calculates EstimatedACKTxTime based on MAX PPDU length.

Figure 18:
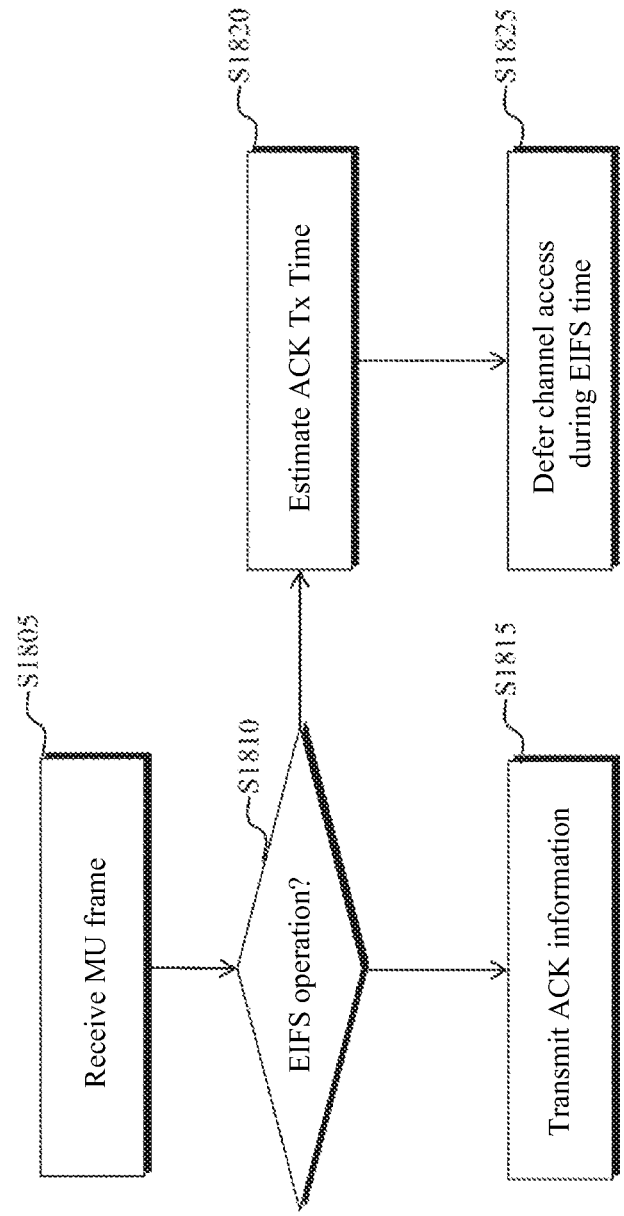
FIG. 18 shows an example of an EIFS operating method according to one embodiment of the present invention.

FIG. 18 shows an example of an EIFS operating method according to one embodiment of the present invention.

Referring to FIG. 18, an STA receives an MU frame [S1805]. The MU frame is HE PPDU based frame and may include HE SIG-A field and/or HE SIG-B field. The MU frame may be OFDMA PPDU format or MU-MIMO PPDU format. The MU frame may include DL MU frame or UL MU frame.

The STA can determine whether the received MU frame causes an EIFS operation (S1810). For example, as a case that PHY-RXEND.indication primitive according to MU frame reception has an error or a case that MAC FCS value for the received MU frame is not matched, if it is determined that a medium is in idle state after the reception of the corresponding MU frame, the STA can determine that the corresponding MU frame causes the EIFS operation.

If the received MU frame does not cause the EIFS operation, the STA can transmit ACK information on the MU frame [S1815]. The ACK information may be transmitted through ACK MAC frame or Block ACK MAC frame, by which the present invention is non-limited.

If the MU frame causes the EIFS operation, the STA estimates ACK transmission time (ACKTxTime) taken for other STAs having received the MU frame to transmit ACK information [S1820]. In estimating the ACK transmission time, the STA can estimate the ACK transmission time by assuming a lowest MCS level among MCS (modulation and coding scheme) levels available for transmission of ACK information and a minimum RU among RUs (resource units) available for transmission of ACK information.

For example, the lowest MCS level available for transmitting ACK information can be obtained from MCS information on SIG-B field included in SIG-A field.

For example, the minimum RU available for transmitting ACK information may include an RU having a smallest frequency resource size among RUs for the MU frame transmission indicated by resource allocation information included in a common part of SIG-B field.

If failing in decoding of SIG-A field, the STA can assume that ACK information is transmitted by MCS 0. If failing in decoding of SIG-B field, the STA can assume that ACK information is transmitted in a unit of 26-tone.

The STA can assume that ACK information is transmitted through the same MCS level as the SIG-B field and the same RU as data of the MU frame.

The STA can estimate the ACK transmission time by considering whether the MU frame is configured with a single MAC protocol data unit (MPDU) or multiple MPDUs.

The SIG-A field or the SIG-B field may include information indicating whether ACK information is transmitted through the same RU as data of the MU frame.

The STA can estimate ACK transmission time by assuming that a preamble has a length of 56 us, that 1 symbol has a length of 14.4 us, that Block ACK MAC frame has 310 bits, and that at least 2 tones in the minimum RU are used for pilot transmission.

The STA defers a channel access during the EIFS time determined based on the estimated ACK transmission time [S1825].

Figure 19:
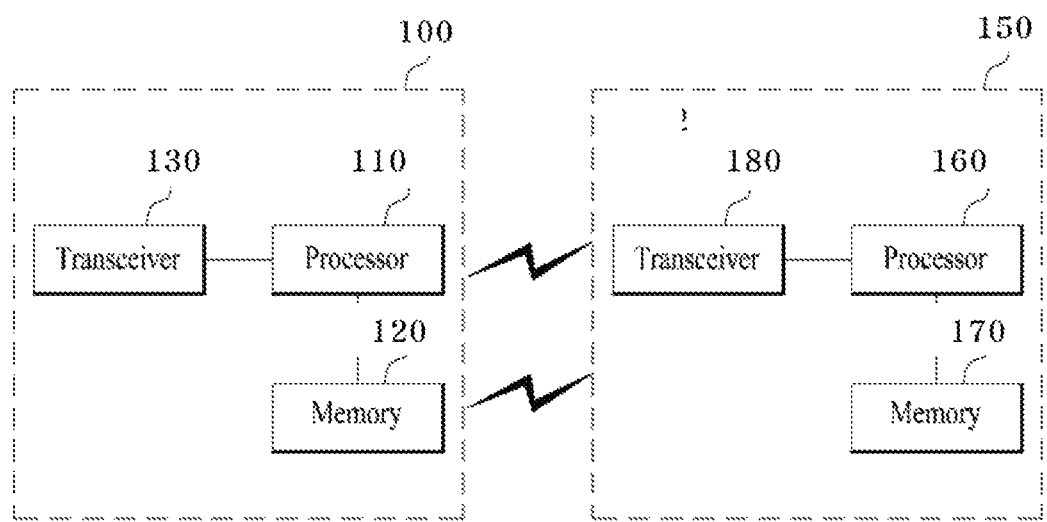
FIG. 19 is a diagram to describe a device according to one embodiment of the present invention.

FIG. 19 is a diagram illustrating apparatuses for implementing the above-described methods.

A wireless apparatus 800 of FIG. 19 may correspond to the above-described STA and a wireless apparatus 850 of FIG. 19 may correspond to the above-described AP.

The STA 800 may include a processor 810, a memory 820, and a transceiver 830, and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described methods may be executed in the form of a module (e.g., a process or a function) performing the above-described functions. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the present disclosure. Although the present disclosure has been described with reference to the preferred embodiments, those skilled in the art will appreciate that various modifications and variations can be made in the present disclosure without departing from the spirit or scope of the present disclosure described in the appended claims. Accordingly, the present disclosure should not be limited to the specific embodiments described herein, but should be accorded the broadest scope consistent with the principles and novel features disclosed herein.

INDUSTRIAL APPLICABILITY

The present invention mentioned in the foregoing description is applicable to various kinds of wireless communication systems as well as to the IEEE 802.11 based WLAN system.

What is claimed is:
1. A method of performing an extended inter-frame space (EIFS) operation by a station (STA) in a wireless local area network (LAN) system supporting multi-user (MU) transmission, comprising:
  receiving an MU frame including an SIG-A field and an SIG-B field;
  estimating an ACK transmission time (ACKTxTime) required for transmitting ACK information from other STAs having received the MU frame, when the MU frame causes the EIFS operation; and
  deferring a channel access for an EIFS time determined based on the estimated ACK transmission time,
  wherein the estimating the ACK transmission time comprises estimating the ACK transmission time by assuming a lowest modulation and coding scheme (MCS) level among MCS levels available for the transmission of the ACK information and a minimum resource unit (RU) among RUs available for the transmission of the ACK information, and
  wherein when the STA fails to decode the SIG-A field, the STA assumes that the ACK information is transmitted with MCS 0 and
  wherein when the STA fails to decode the SIG-B field, the STA assumes that the ACK information is transmitted in a unit of 26-tone.

2. The method of claim 1, wherein the lowest MCS level available for transmitting the ACK information is obtained from MCS information on the SIG-B field included in the SIG-A field.

3. The method of claim 1, wherein the minimum RU available for transmitting the ACK information comprises an RU having a smallest frequency resource size among RUs for transmission of the MU frame indicated by resource allocation information included in a common part of the SIG-B field.

4. The method of claim 1, wherein the STA assumes that the ACK information is transmitted through a same MCS level as that of the SIG-B field and a same RU as that of data of the MU frame.

5. The method of claim 1, wherein the estimating the ACK transmission time comprises estimating the ACK transmission time by considering whether the MU frame is configured with a single MAC protocol data unit (MPDU) or multiple MPDUs.

6. The method of claim 1, wherein the SIG-A field or the SIG-B field includes information indicating whether the ACK information is transmitted through a same RU as that of data of the MU frame.

7. The method of claim 1, wherein the estimating the ACK transmission time comprises estimating the ACK transmission time by assuming that a preamble has a length of 56us, that 1 symbol has a length of 14.4 us, that Block ACK MAC frame has 310 bits, and that at least 2 tones in the minimum RU are used for pilot transmission.

8. A station performing an extended inter-frame space (EIFS) operation by a station (STA) in a wireless local area network (LAN) system supporting multi-user (MU) transmission, the station comprising:
  a receiver to receive an MU frame including an SIG-A field and an SIG-B field; and
  a processor to estimate an ACK transmission time (ACK-TxTime) required for transmitting ACK information from other STAs having received the MU frame when the MU frame causes the EIFS operation and to defer a channel access for an EIFS time determined based on the estimated ACK transmission time,
  wherein in estimating the ACK transmission time, the processor estimates the ACK transmission time by assuming a lowest modulation and coding scheme (MCS) level among MCS levels available for the transmission of the ACK information and a minimum resource unit (RU) among RUs available for the transmission of the ACK information, and
  wherein when the STA fails to decode the SIG-A field, the STA assumes that the ACK information is transmitted with MCS 0 and
  wherein when the STA fails to decode the SIG-B field, the STA assumes that the ACK information is transmitted in a unit of 26-tone.

9. The station of claim 8, wherein the lowest MCS level available for transmitting the ACK information is obtained from MCS information on the SIG-B field included in the SIG-A field.

10. The station of claim 8, wherein the minimum RU available for transmitting the ACK information comprises an RU having a smallest frequency resource size among RUs for transmission of the MU frame indicated by resource allocation information included in a common part of the SIG-B field.

11. The station of claim 8, wherein the processor assumes that the ACK information is transmitted through a same MCS level as that of the SIG-B field and a same RU as that of data of the MU frame.

12. The station of claim 8, wherein the processor estimates the ACK transmission time by considering whether the MU frame is configured with a single MAC protocol data unit (MPDU) or multiple MPDUs.

13. The station of claim 8, wherein the SIG-A field or the SIG-B field includes information indicating whether the ACK information is transmitted through a same RU as that of data of the MU frame.

* * * * *